United States Patent
Ueno et al.

(10) Patent No.: US 10,194,515 B2
(45) Date of Patent: Jan. 29, 2019

(54) BEAM DELIVERY SYSTEM AND CONTROL METHOD THEREFOR

(71) Applicant: GIGAPHOTON INC., Tochigi (JP)

(72) Inventors: Yoshifumi Ueno, Oyama (JP); Takashi Suganuma, Oyama (JP); Yoshiaki Kurosawa, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/613,789

(22) Filed: Jun. 5, 2017

(65) Prior Publication Data

US 2017/0280544 A1   Sep. 28, 2017

Related U.S. Application Data

(63) Continuation of application No. PCT/JP2015/053344, filed on Feb. 6, 2015.

(51) Int. Cl.
*G01N 21/64* (2006.01)
*H05G 2/00* (2006.01)
(Continued)

(52) U.S. Cl.
CPC ............ *H05G 2/008* (2013.01); *G01J 1/0238* (2013.01); *G01J 1/0403* (2013.01); *G01J 1/0411* (2013.01);
(Continued)

(58) Field of Classification Search
CPC .. G01N 21/64; G01N 21/645; G01N 21/6456; G01N 21/6402; G01N 21/6408
See application file for complete search history.

(56) References Cited

U.S. PATENT DOCUMENTS 8,872,114 B2   10/2014   Nakanishi et al.
2010/0078577 A1   4/2010   Moriya et al.
(Continued)

FOREIGN PATENT DOCUMENTS

JP   2000-357835 A   12/2000
JP   2003-347236 A   12/2003
(Continued)

OTHER PUBLICATIONS

International Search Report issued in PCT/JP2015/053344; dated Apr. 21, 2015.
(Continued)

*Primary Examiner* — David Porta
*Assistant Examiner* — Mamadou Faye
(74) *Attorney, Agent, or Firm* — Studebaker & Brackett PC

(57) ABSTRACT

A beam delivery system may include: beam adjusters configured to adjust a divergence angle of a pulse laser beam; a beam sampler configured to separate a part of the pulse laser beam outputted from a first beam adjuster provided at the most downstream among the beam adjusters to acquire a sample beam; a beam monitor configured to receive the sample beam and output a monitored diameter; and a beam delivery controller configured to control the beam adjusters based on the monitored diameter. The beam delivery controller may adjust each of beam adjusters other than the first beam adjuster selected one after another from the most upstream so that the monitored diameter at the beam monitor becomes a predetermined value specific to the beam adjuster, and adjust the first beam adjuster so that the pulse laser beam becomes focused at a position downstream of a target position.

8 Claims, 12 Drawing Sheets

(51) Int. Cl.
*G01J 1/02* (2006.01)
*G01J 1/04* (2006.01)
*G01J 1/42* (2006.01)
*G02B 26/08* (2006.01)
*H01S 3/00* (2006.01)

(52) U.S. Cl.
CPC ........... *G01J 1/0448* (2013.01); *G01J 1/4257* (2013.01); *G02B 26/0816* (2013.01); *H01S 3/005* (2013.01)

(56) References Cited

U.S. PATENT DOCUMENTS

| | | |
|---|---|---|
| 2010/0117009 A1 | 5/2010 | Moriya et al. |
| 2012/0319014 A1 | 12/2012 | Moriya et al. |
| 2013/0148677 A1 | 6/2013 | Moriya et al. |
| 2013/0187065 A1 | 7/2013 | Moriya et al. |
| 2013/0208742 A1* | 8/2013 | Mizoguchi ............ H05G 2/008 372/27 |
| 2014/0085741 A1* | 3/2014 | Lambert ............ G02B 27/0983 359/859 |
| 2015/0264792 A1 | 9/2015 | Suzuki et al. |

FOREIGN PATENT DOCUMENTS

| | | |
|---|---|---|
| JP | 2007-109451 A | 4/2007 |
| JP | 2008-283107 A | 11/2008 |
| JP | 2010-135769 A | 6/2010 |
| JP | 20110-186735 A | 8/2010 |
| WO | 2014/097811 A1 | 6/2014 |

OTHER PUBLICATIONS

Written Opinion issued in PCT/JP2015/053344; dated Apr. 21, 2015.

* cited by examiner

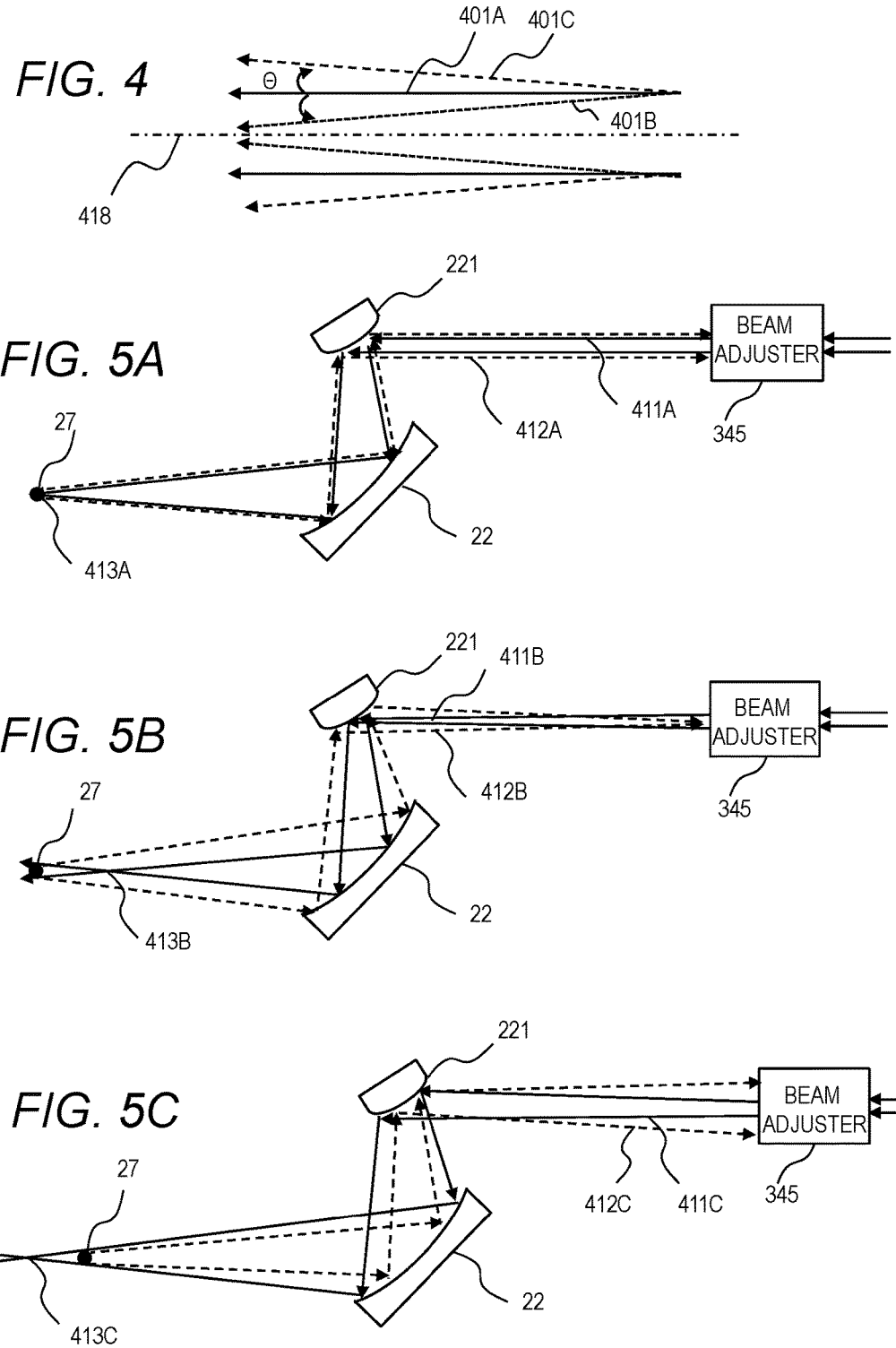

BEAM DELIVERY SYSTEM AND CONTROL METHOD THEREFOR

CROSS-REFERENCE TO RELATED APPLICATIONS

The present application is a continuation application of International Application No. PCT/JP2015/053344 filed on Feb. 6, 2015, the content of which is hereby incorporated by reference into this application.

BACKGROUND

1. Technical Field

This disclosure relates to a beam delivery system and a control method therefor.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 70 nm to 45 nm, and further, microfabrication with feature sizes of 32 nm or less will be required. In order to meet the demand for microfabrication with feature sizes of 32 nm or less, for example, an exposure apparatus is needed in which a system for generating extreme ultraviolet (EUV) light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An example of the disclosure is a beam delivery system configured to deliver a pulse laser beam outputted from a laser apparatus to a target in an extreme ultraviolet light generation apparatus configured to generate extreme ultraviolet light by irradiating the target with the pulse laser beam. The beam delivery system may include: a plurality of beam adjusters configured to adjust a divergence angle of a pulse laser beam outputted from the laser apparatus; a beam sampler configured to separate a part of the pulse laser beam outputted from a first beam adjuster provided at the most downstream among the plurality of beam adjusters to acquire a sample beam; a beam monitor configured to receive the sample beam and output a monitored diameter; and a beam delivery controller configured to control the plurality of beam adjusters based on the monitored diameter. The beam delivery controller may be configured to: adjust each of beam adjusters other than the first beam adjuster selected one after another from the most upstream so that the monitored diameter at the beam monitor becomes a predetermined value specific to the beam adjuster; and adjust the first beam adjuster so that the pulse laser beam becomes focused at a position downstream of a target position.

Another example of the disclosure is a control method for a beam delivery system in an extreme ultraviolet light generation apparatus configured to generate extreme ultraviolet light by irradiating a target with a pulse laser beam. The beam delivery system may include a plurality of beam adjusters configured to adjust a divergence angle of the pulse laser beam. The control method may include: instructing a laser apparatus to output a pulse laser beam; selecting each of beam adjusters other than a first beam adjuster provided at the most downstream among the plurality of beam adjusters one after another from the most upstream; monitoring a sample beam at downstream of the selected beam adjuster; adjusting the selected beam adjuster so that a monitored diameter of the sample beam becomes a predetermined value specific to the selected beam adjuster; and adjusting the first beam adjuster so that the pulse laser beam becomes focused at a point downstream of a target position.

BRIEF DESCRIPTION OF THE DRAWINGS

Hereinafter, selected embodiments of the present disclosure will be described with reference to the accompanying drawings.

FIG. 4 illustrates the definition of divergence angle.

FIG. 5A illustrates a state of a return beam in the case where the focal point of the pulse laser beam is set to the target position.

FIG. 5B illustrates a state of the return beam in the case where the focal point of the pulse laser beam is set to a position upstream of the target position.

FIG. 5C illustrates a state of the return beam in the case where the focal point of the pulse laser beam is set to a position downstream of the target position.

DETAILED DESCRIPTION

Figure 1:
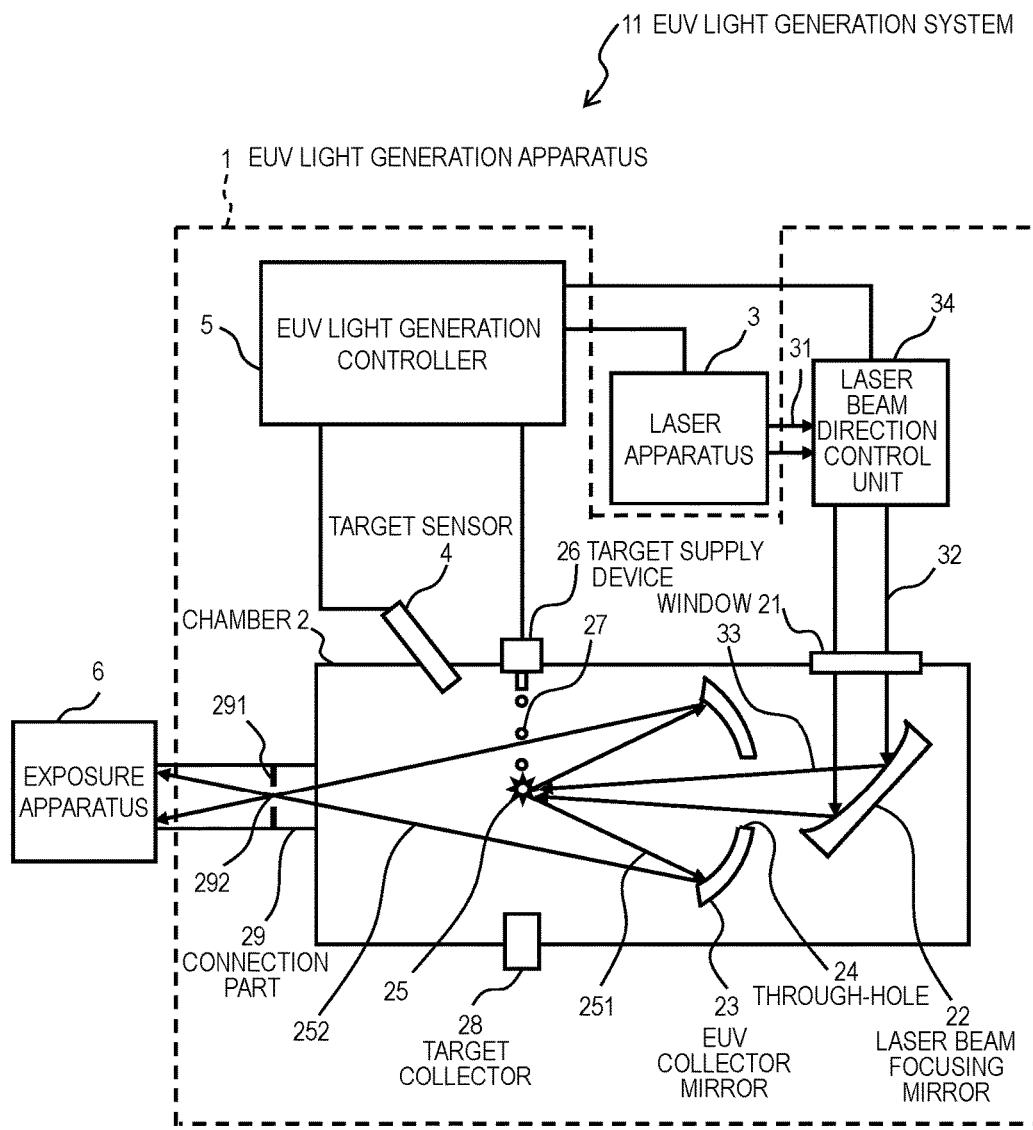
FIG. 1 schematically illustrates an exemplary configuration of an LPP type EUV light generation system.

Contents
1. Overview
2. Overview of EUV Light Generation System
   Configuration
   Operation
3. Details of EUV Light Generation System
   Configuration
   Operation
4. Beam Adjuster
   Configuration
   Operation
   Issues
5. Embodiment 1
   Configuration
   Operation
   Effects
   Other Configuration Examples
6. Embodiment 2
   Configuration
   Operation
   Effects
   Other Configuration Examples
7. Embodiment 3
   Configuration
   Operation
   Effects
8. Other Embodiments
   Other Configuration Example 1
   Other Configuration Example 2
   Other Configuration Example 3

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. OVERVIEW

An LPP type EUV light generation system may generate EUV light by irradiating a target outputted by a target supply device with a pulse laser beam. When the focal point of the pulse laser beam is set to the target position, the laser beam reflected off the surface of the target may become a return beam and travel back along the laser beam path to damage the upstream optical elements. When the focal point of the pulse laser beam is set to a position upstream of the target position, the return light is focused in the beam delivery system to damage the optical elements in the beam delivery system. The focal point of the pulse laser beam in this description means a position where the pulse laser beam is focused.

An example in the present disclosure may be control of a beam delivery system for delivering a pulse laser beam in an EUV light generation apparatus. The beam delivery system may include a plurality of beam adjusters for adjusting the divergence angle of the pulse laser beam. The control may select the plurality of beam adjusters one by one from the most upstream and adjust the selected beam adjusters one after another based on the monitored diameter of the sample beam at a downstream point. The control may adjust the most downstream beam adjuster so that the focal point of the pulse laser beam is located downstream of the target position. The control may prevent the optical elements from being damaged by a return beam.

2. OVERVIEW OF EUV LIGHT GENERATION SYSTEM

Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26. The chamber 2 may be sealed airtight. The target supply device 26 may be mounted onto a wall of the chamber 2, for example. A target material to be supplied by the target supply device 26 may include, but is not limited to, tin, terbium, gadolinium, lithium, xenon, or any combination thereof.

The chamber 2 may have at least one through-hole formed in its wall. The pulse laser beam 32 outputted from the laser apparatus 3 may travel through the through-hole. At least one window 21 may be installed on the chamber 2 and the pulse laser beam 32 outputted from the laser apparatus 3 may travel through the window 21. An EUV collector mirror 23 having, for example, a spheroidal surface may be provided in the chamber 2. The EUV collector mirror 23 may have a first focal point and a second focal point.

The EUV collector mirror 23 may have a multi-layered reflective film including alternately laminated molybdenum layers and silicon layers formed on the surface thereof. For example, the EUV collector mirror 23 is preferably positioned such that the first focal point lies in a plasma generation region 25 or in the vicinity and the second focal point lies at a desired focal point defined by the specifications of an exposure apparatus (an intermediate focal point 292). The EUV collector mirror 23 may have a through-hole 24 formed at the center thereof and a pulse laser beam 33 may travel through the through-hole 24.

The EUV light generation apparatus 1 may include an EUV light generation controller 5 and a target sensor 4. The target sensor 4 may detect at least one of the presence, trajectory, and position of a target and have an imaging function.

Further, the EUV light generation apparatus 1 may include a connection part 29 for allowing the interior of the chamber 2 to be in communication with the interior of the exposure apparatus 6. A wall 291 having an aperture may be provided in the connection part 29. The wall 291 may be positioned such that the second focal point of the EUV collector mirror 23 lies in the aperture.

The EUV light generation apparatus 1 may also include a laser beam direction control unit 34, a laser beam focusing mirror 22, and a target collector 28 for collecting targets 27. The laser beam direction control unit 34 may include an optical element for defining the travelling direction of the laser beam and an actuator for adjusting the position or the attitude of the optical element.

3.2 Operation

With reference to FIG. 1, a pulse laser beam 31 outputted from the laser apparatus 3 may pass through the laser beam direction control unit 34 and, as the pulse laser beam 32, travel through the window 21 and enter the chamber 2. The pulse laser beam 32 may travel inside the chamber 2 along at least one beam path, be reflected by the laser beam focusing mirror 22, and strike at least one target 27 as a pulse laser beam 33.

The target supply device 26 may be configured to output the target(s) 27 toward the plasma generation region 25 in the chamber 2. The target 27 may be irradiated with at least one pulse of the pulse laser beam 33. Upon being irradiated with the pulse laser beam, the target 27 may be turned into plasma, and EUV light 251 may be generated from the plasma. The EUV light 251 may be reflected and focused by the EUV collector mirror 23. EUV light 252 reflected by the EUV collector mirror 23 may be outputted through the intermediate focal point 292 to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. The EUV light generation controller 5 may be configured to control at least one of: the timing when the target 27 is outputted and the direction into which the target 27 is outputted, for example. The EUV light generation controller 5 may be configured to control at least one of: the timing when the laser apparatus 3 oscillates, the direction in which the pulse laser beam 32 travels, and the position at which the pulse laser beam 33 is focused. It will be appreciated that the various controls mentioned above are merely examples, and other controls may be added as necessary.

3. DETAILS OF EUV LIGHT GENERATION SYSTEM

Configuration

Figure 2:
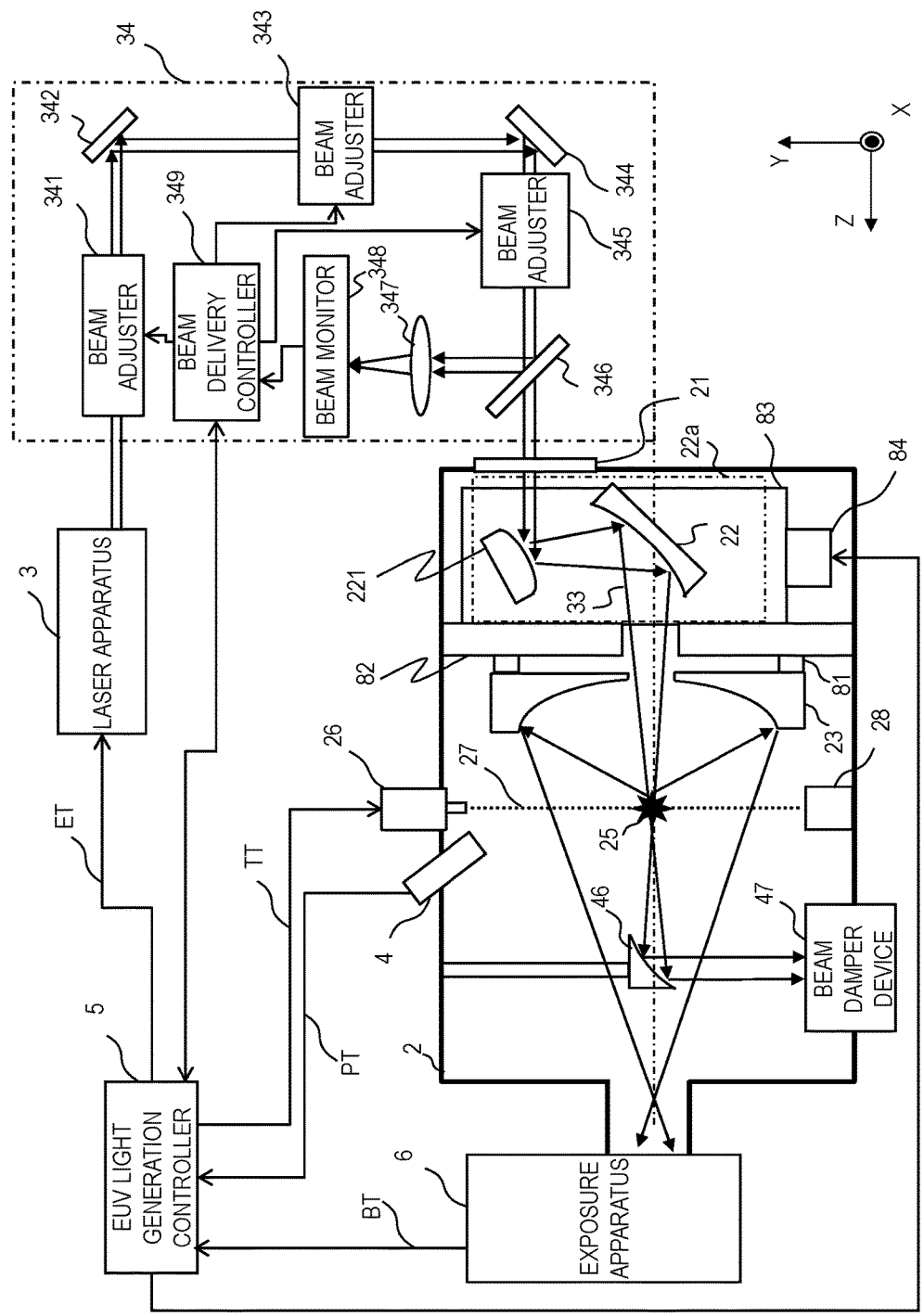
FIG. 2 illustrates details of a configuration example of the EUV light generation system.

FIG. 2 illustrates details of the configuration example of the EUV light generation system 11. As shown in FIG. 2, a laser beam focusing optical system 22a, an EUV collector mirror 23, a target collector 28, an EUV collector mirror holder 81, plates 82 and 83, a laser beam manipulator 84, and a damper mirror 46 may be provided within the chamber 2.

The plate 82 may be anchored to the chamber 2. The plate 83 may be pressed against the plate 82 by the laser beam manipulator 84. The EUV collector mirror 23 may be anchored to the plate 82 with the EUV collector mirror holder 81.

The laser beam focusing optical system 22a may include a convex mirror 221 and a laser beam focusing mirror 22. The laser beam focusing optical system 22a may be disposed on the plate 83. The positions and orientations of the convex mirror 221 and the laser beam focusing mirror 22 may be kept to focus the pulse laser beam 33 reflected by these mirrors at the plasma generation region 25. The target collector 28 may be disposed upon a straight line extending from the trajectory of the target 27.

The laser beam manipulator 84 may be configured to be able to move the laser beam focusing optical system 22a on the plate 83 with respect to the plate 82. The laser beam manipulator 84 may be configured to be able to move the focal point of the pulse laser beam in the directions of the X-axis, the Y-axis, and the Z-axis to the point specified by the EUV light generation controller 5 by moving the laser beam focusing optical system 22a.

The damper mirror 46 may be disposed on the laser beam path and downstream of the plasma generation region 25 and configured to reflect the pulse laser beam that has passed through the plasma generation region 25 toward a beam damper device 47. The damper mirror 46 may collimate and reflect the incident pulse laser beam and may be an off-axis parabolic mirror. The damper mirror 46 may be equipped with a heater for heating its reflective surface to a temperature equal to or higher than the melting point of the target material.

The beam damper device 47 may be anchored on the chamber 2. The beam damper device 47 may be disposed at a place to receive the pulse laser beam reflected by the damper mirror 46. The beam damper device 47 may have a damper window installed on the chamber 2 through which the pulse laser beam reflected by the damper mirror 46 enters the beam damper device 47.

The target supply device 26 may be anchored on the chamber 2. The target supply device 26 may hold a target material in a melted state. A nozzle opening formed in the target supply device 26 may be positioned inside the chamber 2. The target supply device 26 may supply the melted target material to the plasma generation region 25 within the chamber 2 as droplet-shaped targets 27 through the nozzle opening. In the present disclosure, the targets 27 may also be referred to as droplets 27.

The laser beam direction control unit 34 of a laser beam delivery system and the EUV light generation controller 5 may be provided outside the chamber 2. The laser beam direction control unit 34 may direct the pulse laser beam outputted by the laser apparatus 3 to the laser beam focusing optical system 22a via the window 21.

The laser beam direction control unit 34 may include a beam adjuster 341, a high reflectance mirror 342, a beam adjuster 343, a high reflectance mirror 344, a beam adjuster 345, a beam sampler 346, a sample beam focusing optical system 347, a beam monitor 348, and a beam delivery controller 349. The beam adjusters 341, 343, and 345 may be configured to adjust the divergence angle of the received pulse laser beam in outputting the pulse laser beam. The configuration of the beam adjusters 341, 343, and 345 is described later.

The beam sampler 346 may be configured to direct a part of the pulse laser beam to the sample beam focusing optical system 347 as a sample beam. The sample beam focusing optical system 347 may be configured and disposed to focus the sample beam. The beam monitor 348 may be disposed so that the light-receiving surface is located in the vicinity of the focal point of the sample beam focusing optical system 347. The beam monitor 348 may be a beam profiler, for example. The beam delivery controller 349 may be connected with the beam adjusters 341, 343, and 345 and the beam monitor 348.

The EUV light generation controller 5 may receive a control signal from the exposure apparatus 6. The EUV light generation controller 5 may control the target supply device 26, the laser apparatus 3, the beam delivery controller 349, and the laser beam manipulator 84 in accordance with the control signal from the exposure apparatus 6.

Operation

The target supply device 26 may supply droplet-shaped targets 27 to the plasma generation region 25 at a predetermined velocity and a predetermined frequency, in accordance with a target output signal TT from the EUV light generation controller 5. For example, the target supply device 26 may produce droplets at a predetermined frequency within a range of several 10 kHz to several 100 kHz.

A target sensor 4 may detect a target 27 passing through a specific region. The target sensor 4 may output a passage timing signal PT as a detection signal of a target 27 to the EUV light generation controller 5.

The EUV light generation controller 5 may receive a burst signal BT from the exposure apparatus 6. The burst signal BT may be a signal for instructing the EUV light generation system 11 to generate EUV light within a specified period. The EUV light generation controller 5 may perform control to output EUV light to the exposure apparatus 6 during the specified period.

In the period where the burst signal BT is ON, the EUV light generation controller 5 may control the laser apparatus 3 to output a pulse laser beam in accordance with the passage timing signal PT. In the period where the burst signal BT is OFF, the EUV light generation controller 5 may control the laser apparatus 3 not to output a pulse laser beam.

For example, the EUV light generation controller 5 may output the burst signal BT received from the exposure apparatus 6 and a light emission trigger signal ET delayed by a predetermined time from the passage timing signal PT to the laser apparatus 3. When the burst signal BT is ON, the laser apparatus 3 may output a pulse laser beam in response to a pulse of the light emission trigger signal ET.

The EUV light generation controller 5 may adjust the outgoing position of the pulse laser beam with the laser beam manipulator 84. The EUV light generation controller 5 may change the delay time of the light emission trigger signal ET from the passage timing signal PT.

The pulse laser beam may be focused by the laser beam focusing optical system 22a to hit a target that has arrived at the plasma generation region 25 and generate EUV light. The pulse laser beam that has missed the target 27 may hit the damper mirror 46.

The pulse laser beam reflected by the damper mirror 46 may be absorbed by the beam damper device 47 and converted to heat. The generated heat may be discharged to the external by a not-shown cooling device.

The laser apparatus 3 may be provided on a floor different from the floor where the chamber 2 is provided. In such a case, the laser beam direction control unit 34 may deliver the laser beam for a distance of several tens of meters. For this reason, the laser beam direction control unit 34 may adjust the divergence angle of the traveling pulse laser beam with the plurality of beam adjusters 341, 343, and 345 to deliver the pulse laser beam.

The beam sampler 346 may direct a part of the pulse laser beam to enter the laser beam focusing optical system 22a to the sample beam focusing optical system 347 as a sample beam. The beam monitor 348 may send the image of the focused sample beam to the beam delivery controller 349.

The beam delivery controller 349 may control the beam adjusters 341, 343, and 345 based on the image of the focused sample beam to optimize the divergence angle of the pulse laser beam entering the laser beam focusing optical system 22a.

4. BEAM ADJUSTER

Configuration

Figure 3A:
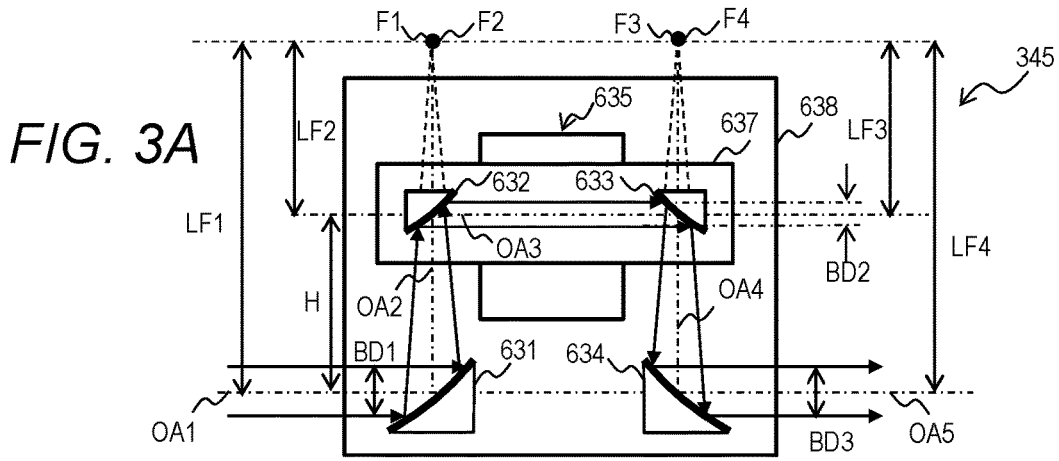
FIG. 3A illustrates a configuration example of a beam adjuster.

FIG. 3A illustrates a configuration example of the beam adjuster 345.

The other beam adjusters 341 and 343 may have the same configuration. The beam adjuster 345 may include two off-axis parabolic concave mirrors 631 and 634 and two off-axis parabolic convex mirrors 632 and 633. The off-axis parabolic concave mirror 631, the off-axis parabolic convex mirror 632, the off-axis parabolic convex mirror 633, and the off-axis parabolic concave mirror 634 may be disposed on and along the optical path of the pulse laser beam in this order.

The off-axis parabolic concave mirror 631 and the off-axis parabolic convex mirror 632 may constitute an upstream pair; the off-axis parabolic convex mirror 633 and the off-axis parabolic concave mirror 634 may constitute a downstream pair. The order of disposition of the off-axis parabolic concave mirror and the off-axis parabolic convex mirror may be inverted between the upstream pair and the downstream pair.

In the state shown in FIG. 3A, the beam adjuster 345 may be configured so that the focal point F1 of the off-axis parabolic concave mirror 631 is located at the same position as the focal point F2 of the off-axis parabolic convex mirror 632. Furthermore, the beam adjuster 345 may be configured so that the focal point F3 of the off-axis parabolic convex mirror 633 is located at the same position as the focal point F4 of the off-axis parabolic concave mirror 634. In the case of disposition where the focal points are located at the same position in each of the upstream pair and the downstream pair, if the pulse laser beam entering the beam adjuster 345 is a collimated beam, the pulse laser beam outgoing from the beam adjuster 345 may be a collimated beam.

The off-axis parabolic concave mirrors 631 and 634 may have curved reflective surfaces having a shape expressed by the same function. That is to say, the functions for defining the shapes of the reflective surfaces of the off-axis parabolic concave mirrors 631 and 634 may be the same. The off-axis parabolic convex mirrors 632 and 633 may have curved reflective surfaces having a shape expressed by the same function. That is to say, the functions for defining the shapes of the reflective surfaces of the off-axis parabolic convex mirrors 632 and 633 may be the same.

The off-axis parabolic concave mirrors 631, 634 and the off-axis parabolic convex mirrors 632, 633 may be disposed so that the optical axis OA2 between the off-axis parabolic concave mirror 631 and the off-axis parabolic convex mirror 632 is parallel to the optical axis OA4 between the off-axis parabolic convex mirror 633 and the off-axis parabolic concave mirror 634.

The off-axis parabolic concave mirrors 631, 634 and the off-axis parabolic convex mirrors 632, 633 may be disposed so that the optical axis OA1 of the pulse laser beam incident on the off-axis parabolic concave mirror 631 matches the optical axis OA5 of the pulse laser beam outgoing from the off-axis parabolic concave mirror 634.

The off-axis parabolic concave mirrors 631, 634 and the off-axis parabolic convex mirrors 632, 633 may be disposed so that the optical axis OA3 between the off-axis parabolic convex mirror 632 and the off-axis parabolic convex mirror 633 is parallel to the optical axis OA1 of the pulse laser beam incident on the off-axis parabolic concave mirror 631 and the optical axis OA5 of the pulse laser beam outgoing from the off-axis parabolic concave mirror 634.

The angle between the optical axis OA1 of the pulse laser beam incident on the off-axis parabolic concave mirror 631 and the optical axis OA2 between the off-axis parabolic concave mirror 631 and the off-axis parabolic convex mirror 632 may be a right angle. That is to say, the angles of incidence and the angles of reflection of the off-axis parabolic concave mirrors 631, 634 and the off-axis parabolic convex mirrors 632, 633 may be 45°. The angles of incidence and the angles of reflection of the mirrors may be defined with the optical axis of the incident beam and the optical axis of the outgoing beam and may be a half of the angle between the optical axis of the incident beam and the optical axis of the outgoing beam.

The distance between the off-axis parabolic convex mirror 632 and the off-axis parabolic concave mirror 631 may be equal to the distance between the off-axis parabolic convex mirror 633 and the off-axis parabolic concave mirror 634. These distances are denoted by H. The distance between the off-axis parabolic convex mirror 632 and the off-axis parabolic concave mirror 631 may be the distance between the point where the reflective surface of the off-axis parabolic concave mirror 631 crosses the optical axis OA2 and the point where the reflective surface of the off-axis parabolic convex mirror 632 crosses the optical axis OA2. The distance between the off-axis parabolic convex mirror 633 and the off-axis parabolic concave mirror 634 may be the distance between the point where the reflective surface of the off-axis parabolic convex mirror 633 crosses the optical axis OA4 and the point where the reflective surface of the off-axis parabolic concave mirror 634 crosses the optical axis OA4.

The beam adjuster 345 may further include a base plate 638 and a one-axially movable stage 635. The one-axially movable stage 635 may include a movable plate 637 movable on the one-axially movable stage 635 in a one-axis direction. The one-axially movable stage 635 may be a moving device that moves the mirrors on the movable plate 637.

The one-axially movable stage 635 may be disposed on the base plate 638 and configured to be able to move the movable plate 637 with respect to the base plate 638. The direction of moving the movable plate 637 may be parallel to the optical axis OA2 between the off-axis parabolic concave mirror 631 and the off-axis parabolic convex mirror 632 and the optical axis OA4 between the off-axis parabolic convex mirror 633 and the off-axis parabolic concave mirror 634.

The off-axis parabolic concave mirrors 631 and 634 may be anchored to the base plate 638. The off-axis parabolic convex mirrors 632 and 633 may be anchored to the movable plate 637. The one-axially movable stage 635 may change the distance between the off-axis parabolic convex mirror 632 and the off-axis parabolic concave mirror 631 and the distance between the off-axis parabolic convex mirror 633 and the off-axis parabolic concave mirror 634 in a direction to simultaneously increase or decrease these distances.

Specifically, as the movable plate 637 is moved, the distance H between the off-axis parabolic convex mirror 632 and the off-axis parabolic concave mirror 631 and the distance H between the off-axis parabolic convex mirror 633 and the off-axis parabolic concave mirror 634 may simultaneously increase or decrease.

Operation

Figure 3B:
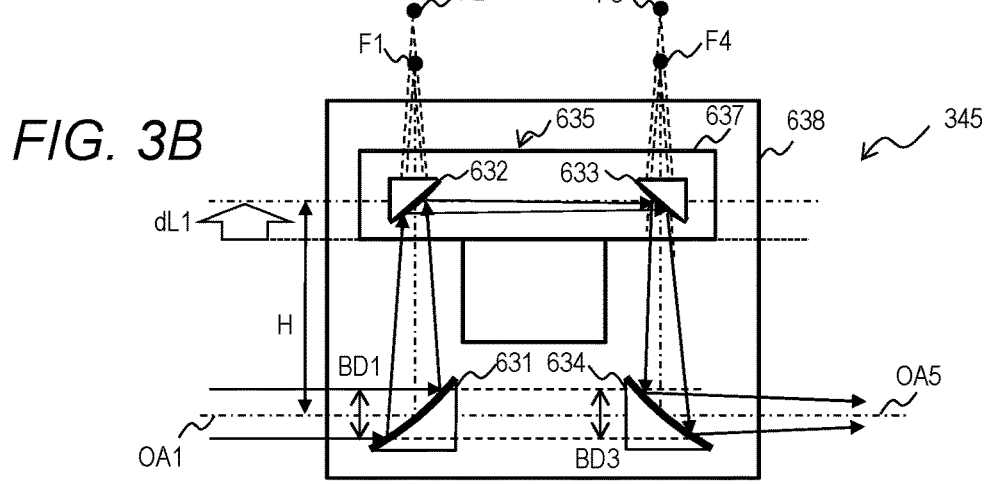
FIG. 3B illustrates a state of the beam adjuster where the movable plate is moved away from off-axis parabolic convex mirrors from the state shown in FIG. 3A.
Figure 3C:
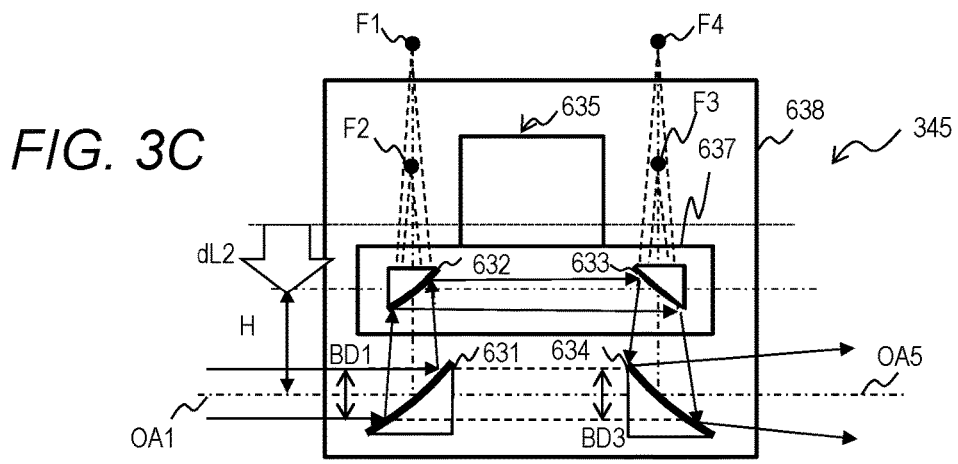
FIG. 3C illustrates a state of the beam adjuster where the movable plate is moved closer to the off-axis parabolic convex mirrors from the state shown in FIG. 3A.

The operation of the beam adjuster 345 is described with reference to FIGS. 3A to 3C. FIG. 3B shows a state of the beam adjuster 345 where the movable plate 637 is moved away from the off-axis parabolic concave mirrors 631 and 634 from the state shown in FIG. 3A. FIG. 3C shows a state of the beam adjuster 345 where the movable plate 637 is moved closer to the off-axis parabolic concave mirrors 631 and 634 from the state shown in FIG. 3A.

In FIG. 3A, the pulse laser beam to hit the off-axis parabolic concave mirror 631 may be a collimated beam. The off-axis parabolic concave mirror 631 may reflect the pulse laser beam to focus the pulse laser beam at the focal point F1.

As described above, the focal point F1 may be located at the same position as the focal point F2 of the off-axis parabolic convex mirror 632. Accordingly, the off-axis parabolic convex mirror 632 may convert the pulse laser beam reflected by the off-axis parabolic concave mirror 631 and traveling to be focused at the focal point F1 into a collimated beam and reflect it. The beam diameter BD2 of the pulse laser beam converted by the off-axis parabolic convex mirror 632 into a collimated beam may be reduced to 1/M12 of the incident beam diameter BD1.

The focal length of the off-axis parabolic concave mirror 631 is defined as LF1 and the focal length of the off-axis parabolic convex mirror 632 is defined as LF2. As described above, the focal point F1 may be located at the same position as the focal point F2. The magnification M12 may be LF1/LF2. The distance H between the off-axis parabolic concave mirror 631 and the off-axis parabolic convex mirror 632 may be LF1−LF2.

The pulse laser beam converted into a collimated beam having a beam diameter BD2 may be reflected by the off-axis parabolic convex mirror 633 like a pulse laser beam that diverges from the focal point F3. As described above, the focal point F3 may be located at the same position as the focal point F4. Accordingly, the off-axis parabolic concave mirror 634 may convert the pulse laser beam diverging from the focal point F3 into a collimated beam having an optical axis OA5, which is substantially the same as the optical axis of the pulse laser beam incident on the off-axis parabolic concave mirror 631, and reflect it.

The beam diameter of the pulse laser beam reflected by the off-axis parabolic convex mirror 633 to hit the off-axis parabolic concave mirror 634 may be enlarged by a magnification M43. The focal length of the off-axis parabolic convex mirror 633 is defined as LF3 and the focal length of the off-axis parabolic concave mirror 634 is defined as LF4. As described above, the focal point F3 may be located at the same position as the focal point F4.

The magnification M43 may be LF4/LF3. If LF1=LF4 and LF2=LF3, the magnification M12 may be equal to the magnification M43. Accordingly, the beam diameter BD3 of the outgoing light from the off-axis parabolic concave mirror 634 may be the same as the beam diameter BD1 of the pulse laser beam incident on the off-axis parabolic concave mirror 631.

The one-axially movable stage 635 may move the movable plate 637 with respect to the base plate 638 in accordance with the control of the beam delivery controller 349. The beam delivery controller 349 may increase or decrease the distance H between the off-axis parabolic concave mirror 631 and the off-axis parabolic convex mirror 632 by moving the movable plate 637. The distance H may be the distance between the point where the reflective surface of the off-axis parabolic concave mirror 631 crosses the optical axis OA2 and the point where the reflective surface of the off-axis parabolic convex mirror 632 crosses the optical axis OA2. The distance between the off-axis parabolic concave mirror 634 and the off-axis parabolic convex mirror 633 may also be the same H. By changing the distance H, the beam delivery controller 349 may collect or diverge the outgoing beam from the beam adjuster 345.

For example, the beam delivery controller 349 may increase the distance H from the state of FIG. 3A by dL1, as shown in FIG. 3B. The divergence angle of the pulse laser beam outgoing from the off-axis parabolic concave mirror 634 may decrease. The beam diameter BD3 of the pulse laser beam outgoing from the off-axis parabolic concave mirror 634 may become slightly smaller than but substantially equal to the beam diameter BD1 of the pulse laser beam incident on the off-axis parabolic concave mirror 631. Furthermore, the optical axis OA1 of the pulse laser beam incident on the off-axis parabolic concave mirror 631 may match the optical axis OA5 of the pulse laser beam outgoing from the off-axis parabolic concave mirror 634.

For another example, the beam delivery controller 349 may decrease the distance H from the state of FIG. 3A by dL2, as shown in FIG. 3C. The divergence angle of the pulse laser beam outgoing from the off-axis parabolic concave mirror 634 may increase. The beam diameter BD3 of the pulse laser beam outgoing from the off-axis parabolic concave mirror 634 may become slightly larger than but substantially equal to the beam diameter BD1 of the pulse laser beam incident on the off-axis parabolic concave mirror 631. Furthermore, the optical axis OA1 of the pulse laser beam incident on the off-axis parabolic concave mirror 631 may match the optical axis OA5 of the pulse laser beam outgoing from the off-axis parabolic concave mirror 634.

Issues

First, the definition of divergence angle is described. FIG. 4 illustrates the definition of divergence angle. In FIG. 4, the pulse laser beam 401A traveling in parallel to the laser beam axis 418 is defined as collimated beam having a divergence angle $\theta=0$. The pulse laser beam 401C traveling in a direction expanding from the laser beam axis 418 is defined as pulse laser beam having a positive divergence angle. The pulse laser beam 401B traveling in a direction converging toward the laser beam axis 418 is defined as pulse laser beam having a negative divergence angle. The divergence angle $\theta$ is defined by the half angle.

FIGS. 5A to 5C illustrate states of the return beam depending on the focused state of the pulse laser beam when hitting a target 27. The arrowed solid lines in FIGS. 5A to 5C represent a pulse laser beam to hit a target 27 and the arrowed broken lines represent a return beam. FIGS. 5A to 5C exemplify the final-stage beam adjuster 345; each pulse laser beam entering the beam adjuster 345 is assumed to be a collimated beam.

FIG. 5A illustrates a state of the return beam in the case where the focal point 413A of the pulse laser beam is set to the target position. The state where the focal point 413A of the pulse laser beam is located at the target position is referred to as best focus state. The pulse laser beam 411A outputted from the beam adjuster 345 may be a collimated beam. The target 27 before turning into plasma may reflect the pulse laser beam by surface reflection. The pulse laser beam reflected off the target 27 may become a return beam.

In the case where the focal point of the pulse laser beam is set to the target position, the return beam may travel back along the optical path of the pulse laser beam to hit a target 27. The return beam 412A entering the beam adjuster 345 may be a collimated beam. Furthermore, the return beam may hit and damage the optical elements defining the upstream optical path of the pulse laser beam. Particularly in the case where the laser apparatus 3 has an MOPA configuration including a master oscillator (MO) and multiple amplifiers (PA), optical elements provided in a more upstream region may have lower laser resistance. In this case, the return beam, which is a part of an amplified high-power laser beam, may damage the optical elements having low laser resistance.

FIG. 5B illustrates a state of the return beam in the case where the focal point 413B of the pulse laser beam is set to a position upstream of the target position. The state where the focal point 413B of the pulse laser beam is located at a position upstream of the target position is referred to as upstream defocused state. The pulse laser beam 411B outputted from the beam adjuster 345 may be a pulse laser beam having a negative divergence angle. The target 27 before turning into plasma may reflect the pulse laser beam by surface reflection. The pulse laser beam reflected off the target 27 may become a return beam.

The return beam 412B to enter the beam adjuster 345 may be a pulse laser beam having a negative divergence angle. The return beam having a negative divergence angle may be focused in the middle of the upstream path of the pulse laser beam. For example, if the return beam is focused in the vicinity of the surface of an optical element of the laser beam direction control unit 34, the return beam may damage the optical element.

FIG. 5C illustrates a state of the return beam in the case where the focal point 413C of the pulse laser beam is set to a position downstream of the target position. The state where the focal point 413C of the pulse laser beam is located at a position downstream of the target position is referred to as downstream defocused state. The pulse laser beam 411C outputted from the beam adjuster 345 may be a pulse laser beam having a positive divergence angle. The target 27 before turning into plasma may reflect the pulse laser beam by surface reflection. The pulse laser beam reflected off the target 27 may become a return beam.

The return beam 412C to enter the beam adjuster 345 may be a pulse laser beam having a positive divergence angle. The return beam having a positive divergence angle may expand and travel back along the optical path of the pulse laser beam; the energy density thereof may be reduced during the travel. Accordingly, the possibility that the optical elements defining the upstream laser beam path could be damaged may be very low.

Figure 5D:
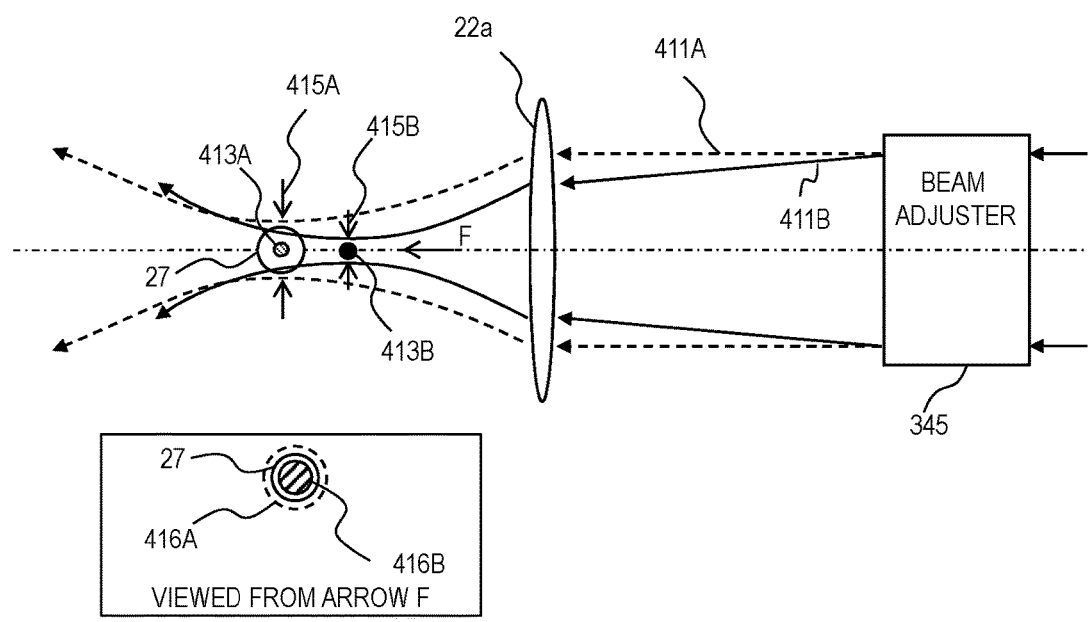
FIG. 5D illustrates irradiation states of a target with the pulse laser beams in FIGS. 5A and 5B.

In the state of FIG. 5B, the return beam may be focused within the laser beam direction control unit 34 and further, the amount of light of the return beam may be larger than the amount of light of the return beam in the state of FIG. 5A. FIG. 5D illustrates irradiation states of a target 27 with pulse laser beams in FIGS. 5A and 5B. In FIG. 5D, the arrowed solid lines represent the pulse laser beam 411B in FIG. 5B and the arrowed broken lines represent the pulse laser beam 411A in FIG. 5A.

The LPP type EUV light generation apparatus 1 may be designed to irradiate a target 27 with a pulse laser beam having a diameter equal to or larger than the target diameter, taking account of the variation in position among the targets 27. The pulse laser beam 411A shown in FIG. 5D is based on this design. On the other hand, when the focal point of the pulse laser beam is set to a position upstream of the target position using the beam adjuster 345, the irradiation state with the pulse laser beam 411B shown in FIG. 5D may be obtained.

The irradiation states of a target 27 with the pulse laser beam 411A and the pulse laser beam 411B are compared by viewing from the traveling direction of the pulse laser beam (viewing from the arrow F). The diameter of the irradiation area 416A with the pulse laser beam 411A may be equal to the spot diameter 415A of the pulse laser beam 411A and slightly larger than the diameter of the target 27. Accordingly, a part of the pulse laser beam 411A may not hit the target 27.

On the other hand, the diameter of the irradiation area 416B with the pulse laser beam 411B may be smaller than the diameter of the target 27 and the entire pulse laser beam 411B may hit the target 27. Since the diameter of the pulse laser beam 411B incident on the laser beam focusing optical system 22a is smaller than the diameter of the pulse laser beam 411A incident on the laser beam focusing optical system 22a, the spot diameter 415B may also be smaller. This makes the focal depth deeper; accordingly, even if the focal point 413B is located at an upstream position of the pulse laser beam, the target 27 may be irradiated with the pulse laser beam 411B in a smaller diameter than the pulse laser beam 411A.

As described above, the target 27 in FIG. 5B may be irradiated with the pulse laser beam 411B in a smaller diameter than the target 27 in FIG. 5A irradiated with the pulse laser beam 411A, so that the target 27 in FIG. 5B may receive a larger amount of light. Accordingly, assuming that the rate of reflection off the target 27 with respect to the amount of light hitting the target 27 is invariable, the amount of light of the return beam in the irradiation state with a pulse laser beam in FIG. 5B may be larger than the amount of light of the return beam in the irradiation state with a pulse laser beam in FIG. 5A.

The inventors have acquired this knowledge through separate experiments on individual states of FIGS. 5A to 5C. As a result, the following issue has been clarified. When the focal point of a pulse laser beam is set to the target position, the pulse laser beam reflected off the surface of the target may travel back along the pulse laser beam path as a return beam and damage upstream optical elements. When the focal point of a pulse laser beam is set to a position upstream of the target position, the return beam may be focused in the middle of the upstream laser beam path including the transmission optical system and damage the optical elements in the laser beam direction control unit 34, for example.

5. EMBODIMENT 1

Configuration

An EUV light generation system 11 in Embodiment 1 may have the same configuration as the configuration shown in FIG. 2.

Operation

Figure 6A:
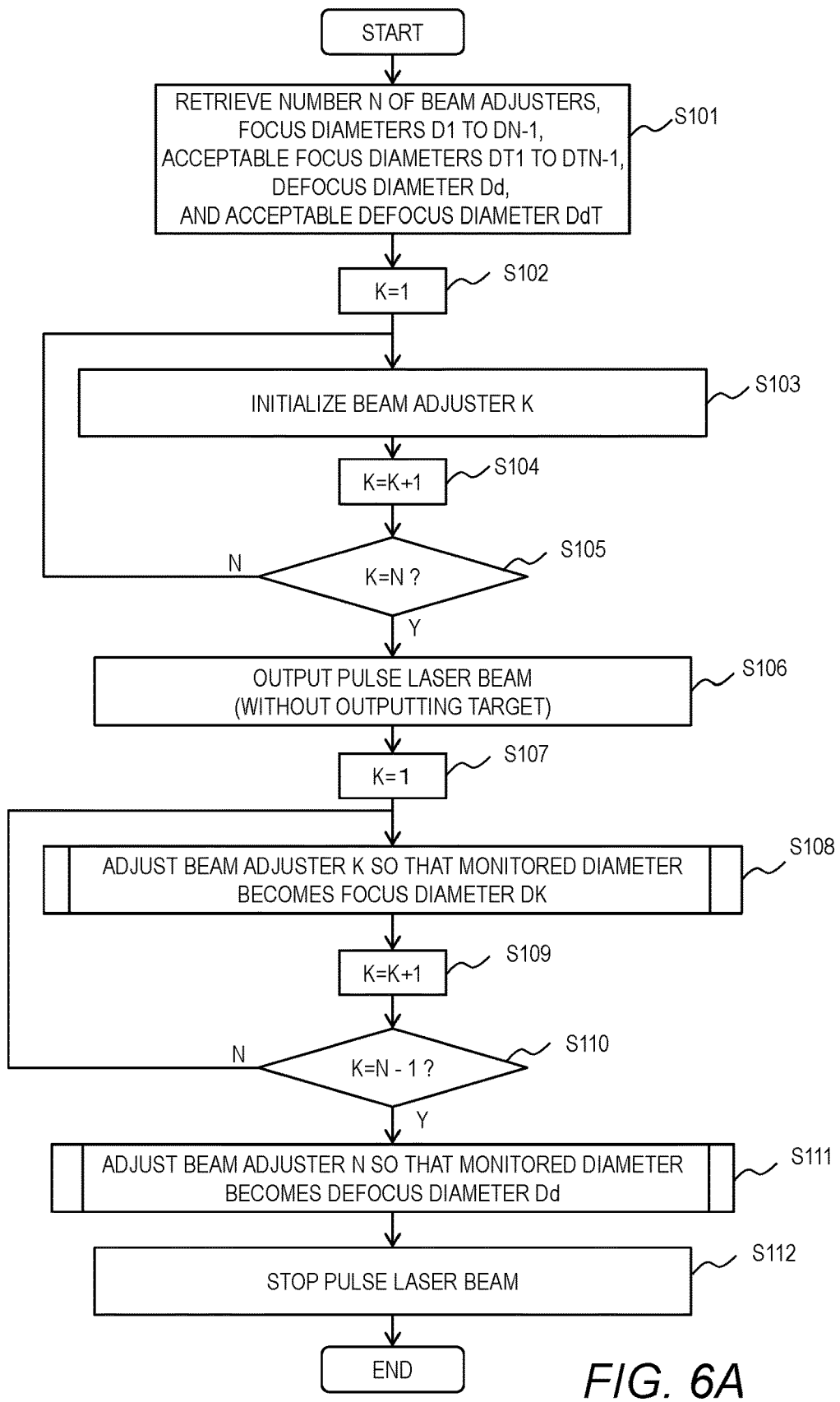
FIG. 6A is a flowchart of operation of a beam delivery controller in Embodiment 1.
Figure 6B:
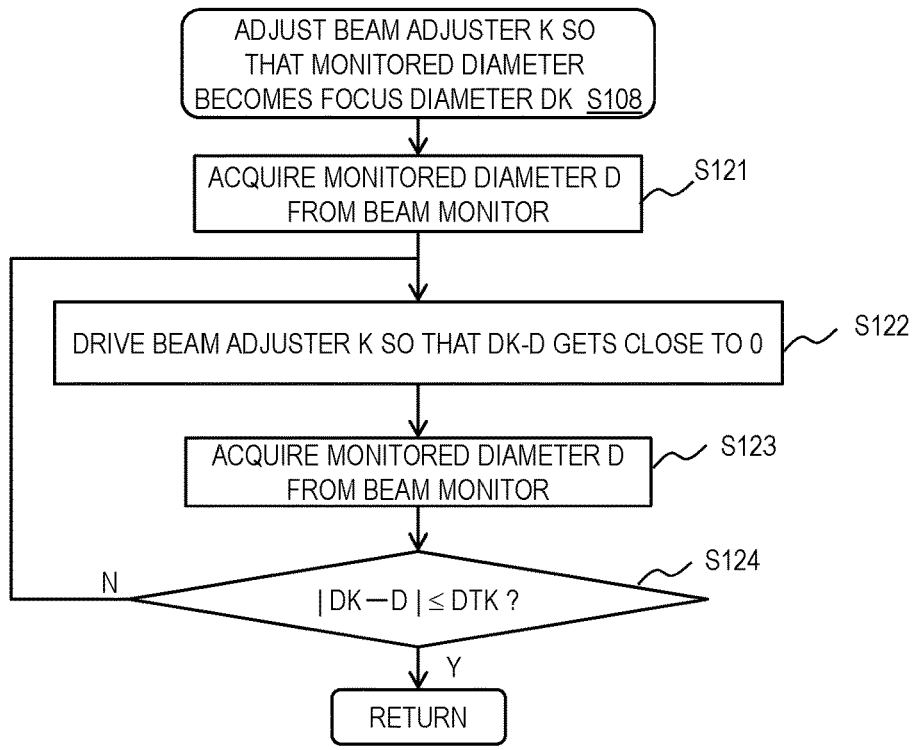
FIG. 6B is a detailed flowchart of Step S108 in FIG. 6A.
Figure 6C:
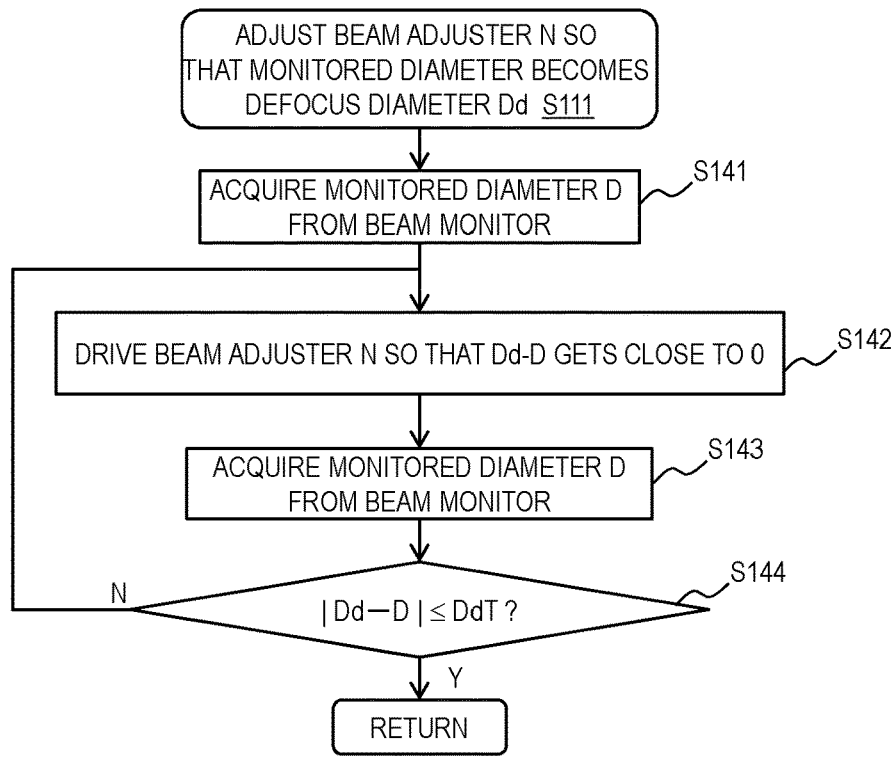
FIG. 6C is a detailed flowchart of Step S111 in FIG. 6A.

FIGS. 6A to 6C are flowcharts of operation of a beam delivery controller 349 in Embodiment 1. The beam delivery controller 349 may set all the beam adjusters in the laser beam direction control unit 34 to output a pulse laser beam maintaining the divergence angle of the incident pulse laser beam. Thereafter, the beam delivery controller 349 may adjust the beam adjusters except for the beam adjuster at the final stage one after another from the most upstream so that each beam adjuster outputs a collimated beam. Furthermore, the beam delivery controller 349 may adjust the final-stage beam adjuster to yield a downstream defocused state.

The operation is described specifically. With reference to FIG. 6A, the beam delivery controller 349 may retrieve parameters predetermined for the beam adjusters in the laser beam direction control unit 34 (S101). The parameters may be determined by experiment and stored in a not-shown storage medium. The parameters to be retrieved may include number N of beam adjusters, focus diameters D1 to DN−1, acceptable focus diameters DT1 to DTN−1, a defocus diameter Dd, and an acceptable defocus diameter DdT.

The number N of beam adjusters may be the total number of beam adjusters in the laser beam direction control unit 34. The ordinal number of the beam adjuster may increase from 1 to N from the most upstream to the most downstream.

The focus diameters D1 to DN−1 may be the target focus diameters for the beam adjusters 1 to N−1, respectively, to be observed by the beam monitor 348. The focus diameters D1 to DN−1 may be the target values to minimize the focus diameters of the beam adjusters 1 to N−1 in the beam monitor 348 in adjusting the beam adjusters 1 to N−1 one after another from the most upstream.

The acceptable focus diameters DT1 to DTN−1 may be the acceptable values in adjusting the beam adjusters 1 to N−1 one after another so as to minimize the beam diameters of the beam adjusters 1 to N−1 in the beam monitor 348.

The defocus diameter Dd may be the target defocus diameter in the beam monitor 348 when the pulse laser beam has achieved a downstream defocused state. The acceptable defocus diameter DdT may be an acceptable value for the defocus diameter of the beam adjuster N in the beam monitor 348.

Next, the beam delivery controller 349 may initialize the beam adjusters 1 to N (S102 to S105). Specifically, the beam delivery controller 349 may substitute 1 for a variable K (S102). The beam delivery controller 349 may initialize the beam adjuster K (S103). Specifically, the beam delivery controller 349 may adjust the beam adjuster K to output a collimated beam when the beam adjuster K receives a collimated beam. The adjusted beam adjuster K may output a pulse laser beam maintaining the divergence angle of the incident pulse laser beam. However, since the laser beam outputted from the laser apparatus 3 may not be a collimated beam, the laser beam traveling between a beam adjuster and the next beam adjuster or the laser beam outputted from the beam adjuster K may have a positive or negative divergence angle.

Next, the beam delivery controller 349 may increment the variable K (S104). If the value of the variable K is not N (S105: N), the beam delivery controller 349 may return to Step S103. If the value of the variable K is N (S105: Y), the initialization of the beam adjusters 1 to N has been completed; the beam delivery controller 349 may proceed to Step S106.

At Step S106, the beam delivery controller 349 may control the laser apparatus 3 through the EUV light generation controller 5 to output a pulse laser beam. At this step, a target 27 does not need to be outputted to prevent the optical elements from being damaged by the return beam from the target 27.

Next, the beam delivery controller 349 may adjust the beam adjusters 1 to N−1 so that the monitored diameters of the beam adjusters 1 to N−1 become the focus diameters D1 to DN−1 (S107 to S110). Through this processing, the beam adjusters 1 to N−1 may be adjusted to achieve an optimum beam transmission state. The optimum beam transmission state may be a state where the laser beam outputted from each of the beam adjusters 1 to N−1 is collimated. Alternatively, the optimum beam transmission state may be a state where the beam waist of the laser beam may be located at the center between a beam adjuster and the next beam adjuster.

Specifically, the beam delivery controller 349 may substitute 1 for the variable K (S107). Further, the beam delivery controller 349 may adjust the beam adjuster K so that the monitored diameter at the beam monitor 348 becomes the focus diameter DK (S108). The detailed adjustment method will be described later with reference to FIG. 6B.

Next, the beam delivery controller 349 may increment the variable K (S109). If the value of the variable K is not N−1 (S110: N), the beam delivery controller 349 may return to Step S108. If the value of the variable K is N−1 (S110: Y), the adjustment of the beam adjusters 1 to N−1 has been completed; the beam delivery controller 349 may proceed to adjustment of the beam adjuster N (S111).

At Step S111, the beam delivery controller 349 may adjust the beam adjuster N so that the monitored diameter at the beam monitor 348 becomes the defocus diameter Dd. The details of the adjustment method will be described later with reference to FIG. 6C. The state of the pulse laser beam outputted from the beam adjuster N may be a downstream defocused state. When the adjustment of the beam adjuster N is completed, the beam delivery controller 349 may control the laser apparatus 3 through the EUV light generation controller 5 to stop emitting the pulse laser beam (S112).

The method of adjusting each of the beam adjusters 1 to N−1 (S108) is described with reference to FIG. 6B. FIG. 6B is a detailed flowchart of Step S108. First, the beam delivery controller 349 may acquire a measured monitored diameter D from the beam monitor 348 (S121). Next, the beam delivery controller 349 may drive the beam adjuster K so that the difference between the focus diameter DK and the monitored diameter D gets close to 0 (S122).

The beam delivery controller 349 may acquire a measured monitored diameter D from the beam monitor 348 (S123). The beam delivery controller 349 may determine whether the absolute value of the difference between the focus diameter DK and the monitored diameter D is equal to or smaller than the acceptable focus diameter DTK for the beam adjuster K (S124). If the determination is No (S124: N), the beam delivery controller 349 may return to Step S122. If the determination is Yes (S124: Y), the beam delivery controller 349 may terminate this processing.

Next, the method of adjusting the beam adjuster N (S111) is described with reference to FIG. 6C. FIG. 6C is a detailed flowchart of Step S111. First, the beam delivery controller 349 may acquire a measured monitored diameter D from the beam monitor 348 (S141). Next, the beam delivery controller 349 may drive the beam adjuster N so that the difference between the defocus diameter Dd and the monitored diameter D gets close to 0 (S142).

The beam delivery controller 349 may acquire a measured monitored diameter D from the beam monitor 348 (S143). The beam delivery controller 349 may determine whether the absolute value of the difference between the defocus diameter Dd and the monitored diameter D is equal to or smaller than the acceptable defocus diameter DdT (S144). If the determination is No (S144: N), the beam delivery controller 349 may return to Step S142. If the determination is Yes (S144: Y), the beam delivery controller 349 may terminate this processing.

Effects

The EUV light generation system 11 in Embodiment 1 may automatically adjust the beam adjusters to achieve a downstream defocused state; accordingly, the optical elements may be prevented from being damaged by a return beam. The downstream defocused state may be achieved speedily and appropriately by adjusting a plurality of beam adjusters one after another from the most upstream beam adjuster.

Initializing the beam adjusters to a specific state where the divergence angle of the incident beam is maintained before performing adjustment based on the monitored diameter may enable the subsequent adjustment of each beam adjuster to be performed speedily and appropriately. Adjusting the upstream beam adjusters to achieve an optimum beam transmission state before adjusting the final-stage beam adjuster may fix the focal point of the pulse laser beam and the divergence angle to specific conditions before adjusting the final-stage beam adjuster. As a result, adjustment of the final-stage beam adjuster to achieve an optimum downstream defocused state may be facilitated.

Adjusting the final-stage beam adjuster in the laser beam direction control unit 34 to achieve a downstream defocused state may lead to achieving an optimum downstream defocused state of the pulse laser beam more unfailingly.

Other Configuration Examples

The step of initializing the beam adjusters may be omitted. The beam delivery controller 349 may adjust only a part of the beam adjusters in the laser beam direction control unit 34 based on the monitored diameter.

For example, the beam delivery controller 349 may reset the beam adjuster 345 to the initialized state in which the divergence angle does not change and adjust the beam adjusters 341 and 343 based on the monitored diameter. The more downstream beam adjuster 343 between the beam adjusters 341 and 343 to be adjusted may be adjusted to a downstream defocused state and the beam adjuster 341 may be adjusted to an optimum beam transmission state. Alternatively, the beam delivery controller 349 may selectively adjust a plurality of non-successive beam adjusters, such as the beam adjusters 341 and 345.

The laser beam direction control unit 34 may include beam samplers provided next to the beam adjusters 341, 343, and 345 and beam monitors for monitoring the sample beams of the beam samplers. The beam delivery controller 349 may adjust the beam adjusters 341, 343, and 345 based on the monitored diameters of the sample beams taken from the beam samplers next to the beam adjusters 341, 343, and 345.

The processing of FIG. 6C (S111) may be executed when EUV light is being generated. Then, the downstream defocused state may be maintained when EUV light is being generated. The laser apparatus 3 may include a pre-pulse laser apparatus for outputting a pre-pulse laser beam and a main pulse laser apparatus for outputting a main pulse laser beam.

The EUV light generation system 11 may irradiate a target 27 with a pre-pulse laser beam before irradiating the target with a main pulse laser beam. In this configuration, the beam delivery controller 349 may perform the above-described processing for the beam delivery system for the pre-pulse laser beam path.

6. EMBODIMENT 2

At Step S108 to adjust the beam adjuster K so that the monitored diameter at the beam monitor 348 becomes the focus diameter DK, a focused sample beam may enter the beam monitor 348. In contrast, at Step S111 to adjust the beam adjuster N so that the monitored diameter at the beam monitor 348 becomes the defocus diameter Dd, the sample beam entering the beam monitor 348 may have lower energy density. For this reason, the laser beam direction control unit 34 may include a configuration for improving the accuracy in measurement at the beam monitor 348.

Configuration

Figure 7:
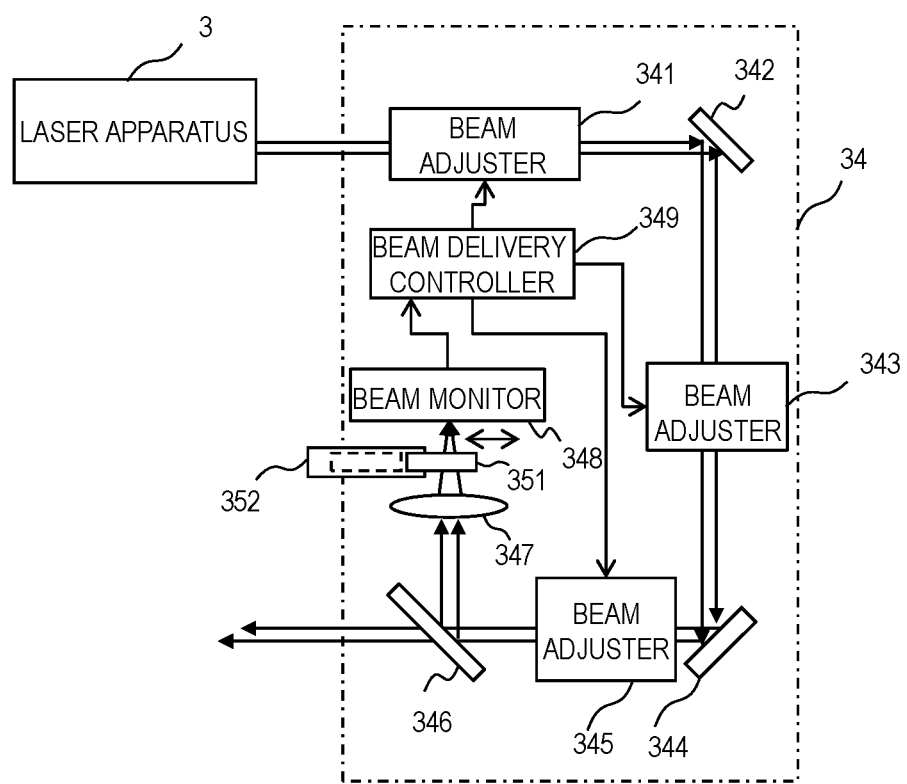
FIG. 7 illustrates a configuration example of a laser beam direction control unit in Embodiment 2.

FIG. 7 illustrates a configuration example of a laser beam direction control unit 34 in Embodiment 2. The laser beam direction control unit 34 may include a filter insertion stage 352 that is capable of inserting and retracting a neutral density (ND) filter 351 with respect to the sample beam path between the sample beam focusing optical system 347 and the beam monitor 348. The ND filter 351 may substantially equally reduce the amount of transmitted light of wavelengths in the sample beam.

The ND filter 351 may be replaced with a beam splitter. The beam splitter may be disposed to be slanted with respect to the sample beam path. The filter insertion stage 352 may be connected with the beam delivery controller 349.

Operation

Figure 8:
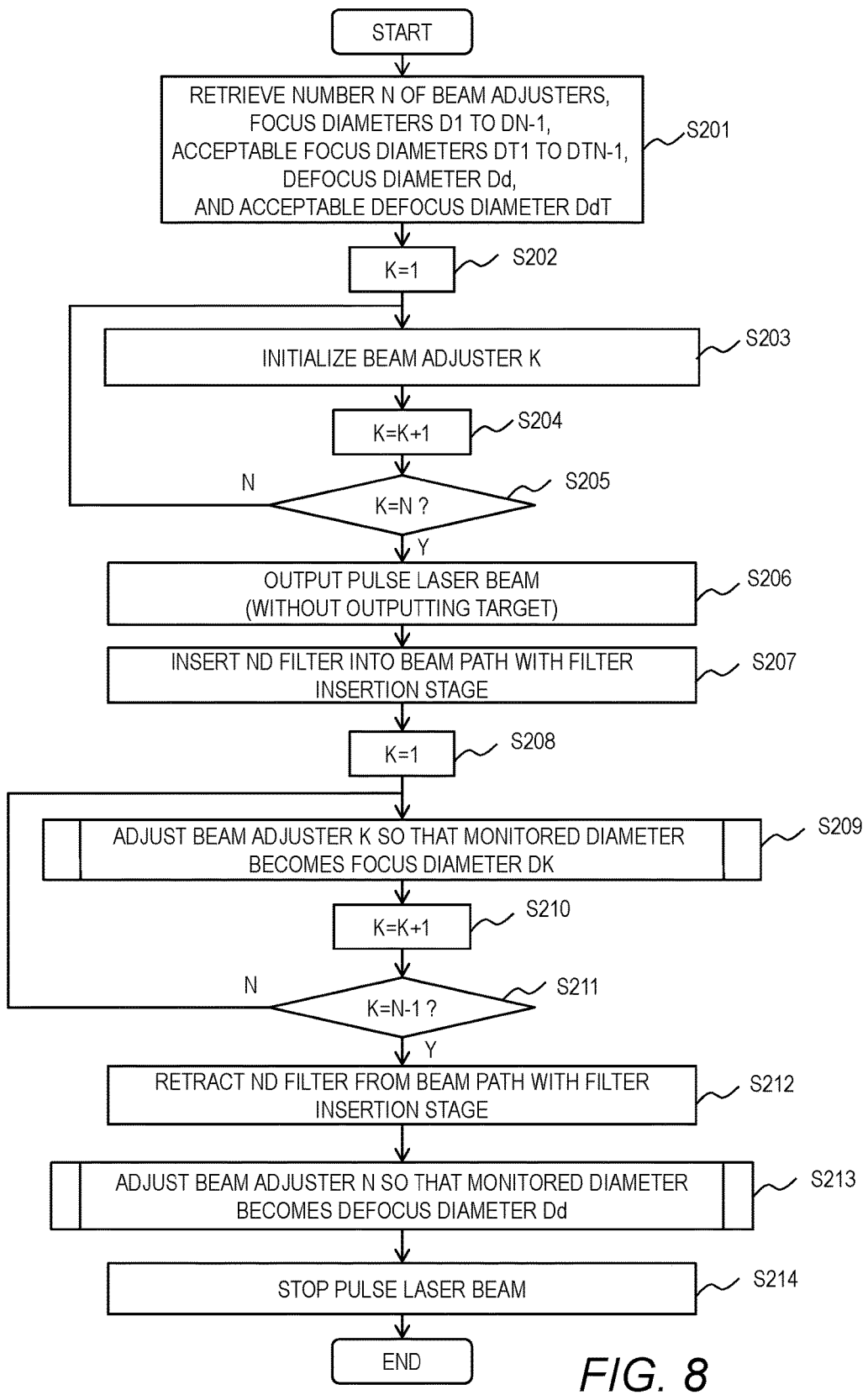
FIG. 8 illustrates a flowchart of operation of a beam delivery controller in Embodiment 2.

FIG. 8 is a flowchart of the operation of the beam delivery controller 349 in Embodiment 2. The beam delivery controller 349 may insert the ND filter 351 in the sample beam path before adjusting the beam adjusters 1 to N−1. The beam delivery controller 349 may retract the ND filter 351 from the sample beam path before adjusting the beam adjuster N.

The operation is described specifically. Steps S201 to S206 may be the same as Steps S101 to S106 in FIG. 6A in Embodiment 1. At Step S207, the beam delivery controller 349 may insert the ND filter 351 into the sample beam path with the filter insertion stage 352.

Steps S208 to S211 may be the same as Steps S107 to S110 in FIG. 6A. At Step S212, the beam delivery controller 349 may retract the ND filter 351 from the sample beam path with the filter insertion stage 352. Steps S213 and S214 may be the same as Steps S111 and S112 in FIG. 6A.

Effects

Embodiment 2 may improve the accuracy in measurement at the beam monitor 348 by reducing the variation in energy density among the sample beams incident on the beam monitor 348 in adjusting the beam adjusters 1 to N.

Other Configuration Examples

An optical system including a polarizing element and a wavelength plate may be provided on the sample beam path. The laser beam direction control unit 34 may include a rotatable stage for rotating the wavelength plate. The beam delivery controller 349 may change the rotational angle of the wavelength plate in accordance with the energy density of the sample beam.

Two polarizers whose transmitting and polarizing directions are orthogonal to each other may be provided on the sample beam path. The laser beam direction control unit 34 may have a rotatable stage for rotating one of the polarizers. The beam delivery controller 349 may change the rotational angle of the polarizer in accordance with the energy density of the sample beam.

If the gain of the beam monitor 348 is variable, the beam delivery controller 349 may change the gain of the beam monitor 348 in accordance with the energy density of the sample beam. The beam delivery controller 349 may reduce the gain when the energy density of the sample beam is high and increase the gain when the energy density of the sample beam is low.

The beam delivery controller 349 may change the number of images to be acquired and integrated at the beam monitor 348 in accordance with the energy density of the sample beam. The beam delivery controller 349 may reduce the number of images to be acquired and integrated when the energy density of the sample beam is high and increase the number of images to be acquired and integrated when the energy density of the sample beam is low. The beam monitor 348 may include a built-in optical chopper. The beam delivery controller 349 may increase the rotation speed of the chopper when the energy density of the sample beam is high and reduce the rotation speed of the chopper when the energy density of the sample beam is low.

7. EMBODIMENT 3

Configuration

Figure 9:
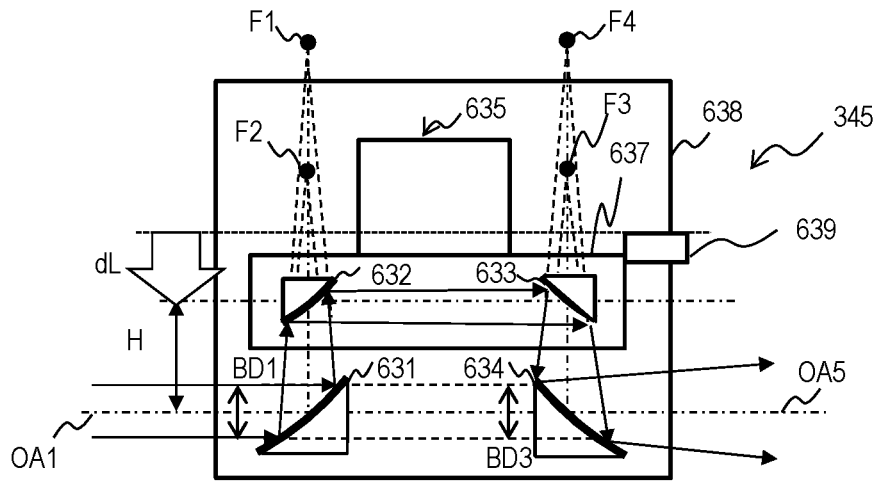
FIG. 9 illustrates a configuration example of a beam adjuster in Embodiment 3.

FIG. 9 illustrates a configuration example of a beam adjuster 345 in Embodiment 3. The beam adjuster 345 may include a proximity switch 639 for limiting the range of movement of the movable plate 637. The proximity switch 639 may be connected with the beam delivery controller 349. The proximity switch 639 may be configured to output a detection signal to the beam delivery controller 349 when the movable plate 637 reaches the proximity of the best focusing position from the defocusing position.

Operation

When the beam delivery controller 349 moves the movable plate 637 from the defocusing position toward the best focusing position, the proximity switch 639 may output a detection signal at a specified position just before the best focusing position. The detection signal may be sent to the beam delivery controller 349. The beam delivery controller 349 may stop the movable plate 637 in response to the detection signal. When a pulse laser beam is not outputted, the beam delivery controller 349 may ignore the detection signal from the proximity switch 639. The proximity switch 639 may be any type of an inductive type, a capacitive type, an ultrasonic type, a photoelectric type, and a magnetic type.

The like function may be implemented by software for limiting the range of movement of the one-axially movable stage in accordance with the output value of the encoder of the one-axially movable stage.

Effects

Embodiment 3 may effectively prevent the beam adjuster from becoming the best focusing state in adjusting the beam adjuster when EUV light is being generated.

8. OTHER EMBODIMENTS

Other configuration examples of the beam adjuster 345 are described.

Other Configuration Example 1

Figure 10:
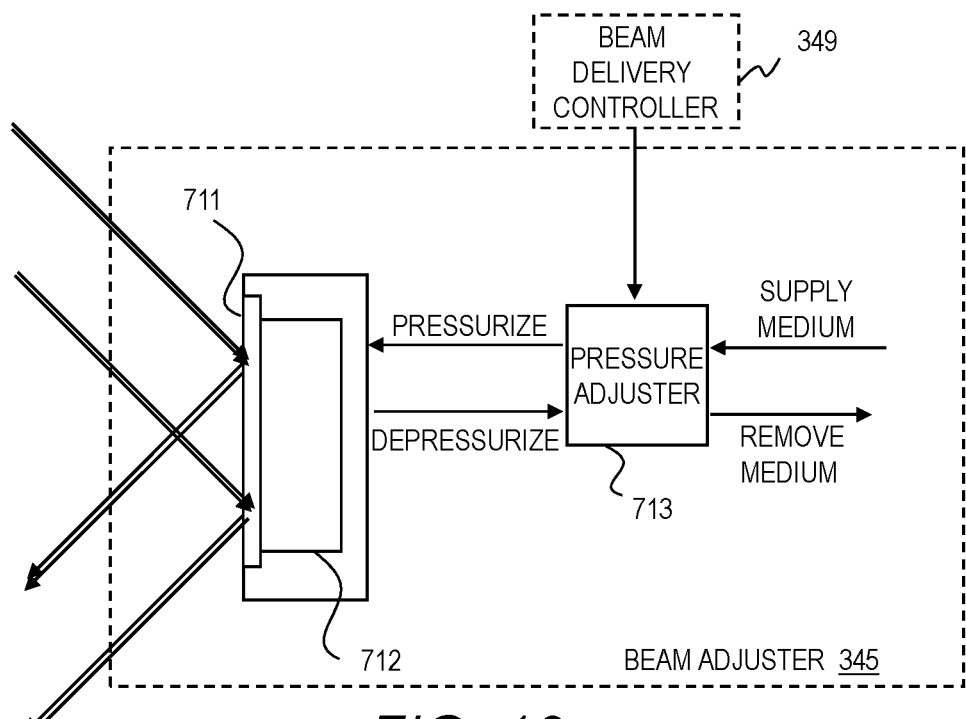
FIG. 10 illustrates another configuration example of the beam adjuster.

FIG. 10 illustrates another configuration example of the beam adjuster 345. The other beam adjusters 341 and 343 may have the same configuration. The beam adjuster 345 may include a deformable high-reflectance reflector 711 and a container 712 disposed behind the high-reflectance reflector 711 to contain a liquid or gas medium. The high-reflectance reflector 711 may be concaved when the medium is pressurized and convexed when the medium is depressurized. The container 712 may be connected with a pressure adjuster 713. The pressure adjuster 713 may be connected with the beam delivery controller 349.

The beam adjuster 345 may change the pressure applied to the high-reflectance reflector 711 by supplying the medium into or removing the medium from the container 712 with the pressure adjuster 713. The beam delivery controller 349 may control the pressure applied to the backside of the high-reflectance reflector 711 with the pressure adjuster 713 to deform the high-reflectance reflector 711 in adjusting the divergence angle. The high-reflectance reflector 711 may be coated with a film that reflects the driver laser beam at high reflectance.

Other Configuration Example 2

Figure 11A:
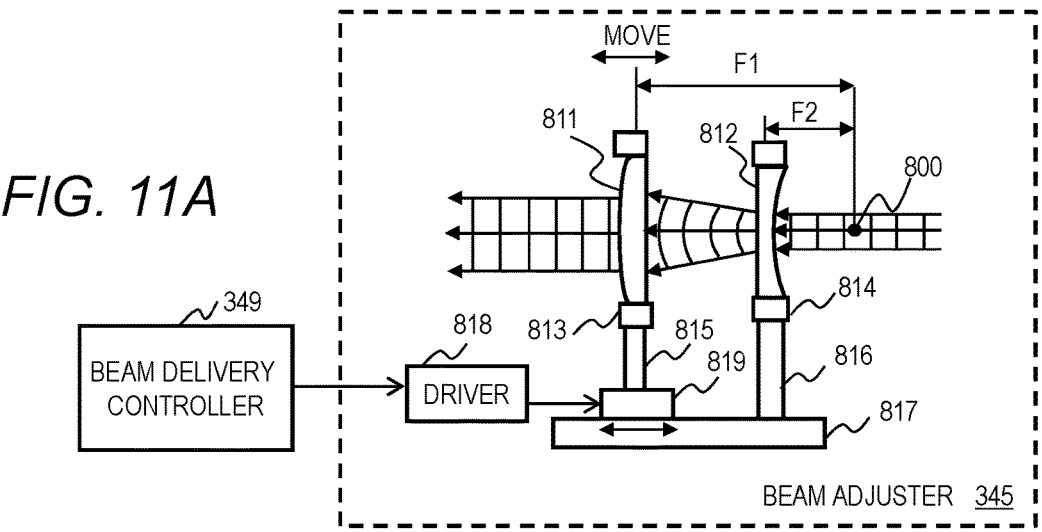
FIG. 11A illustrates another configuration example of the beam adjuster.
Figure 11B:
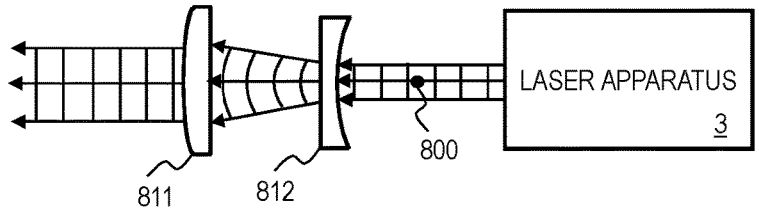
FIG. 11B illustrates operation of the beam adjuster shown in FIG. 11A.
Figure 11C:
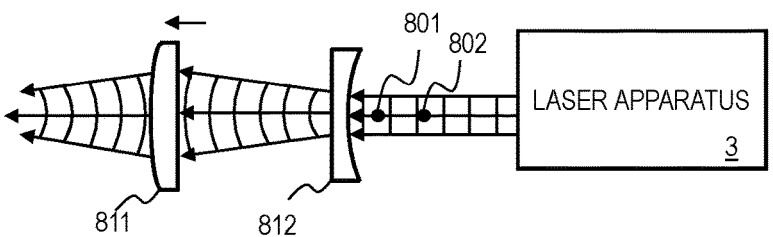
FIG. 11C illustrates operation of the beam adjuster shown in FIG. 11A.
Figure 11D:
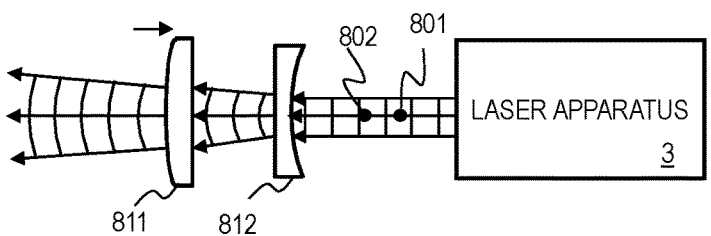
FIG. 11D illustrates operation of the beam adjuster shown in FIG. 11A.

FIG. 11A illustrates another configuration example of the beam adjuster 345. FIGS. 11B to 11D illustrate operation of the beam adjuster 345. The other beam adjusters 341 and 343 may have the same configuration.

As illustrated in FIG. 11A, the beam adjuster 345 may include a spherical convex lens 811 held in a lens holder 813 and a spherical concave lens 812 held in a lens holder 814. The lens holders 813 and 814 may be supported by the supporters 815 and 816, respectively. The supporter 816 may be secured to a fixed stage 817. The supporter 815 may be secured to a slider 819 slidable on the fixed stage 817. A driver 818 may move the slider 819 in accordance with an instruction from the beam delivery controller 349.

The spherical convex lens 811 may have a focal length F1 and the spherical concave lens 812 may have a focal length F2. In the state shown in FIG. 11A, the focal point of the spherical convex lens 811 and the focal point of the spherical concave lens 812 may be located at the same confocal point 800.

In the state shown in FIG. 11B, the focal point of the spherical convex lens 811 and the focal point of the spherical concave lens 812 may be located at the same confocal point 800. The beam adjuster 345 may transform the incident plane waves to plane waves having a different cross-sectional area.

As illustrated in FIG. 11C, the slider 819 may slide downstream from the position shown in FIG. 11B to move the spherical convex lens 811 in the direction being away from the spherical concave lens 812. The focal point 801 of the spherical convex lens 811 may be positioned downstream of the focal point 802 of the spherical concave lens 812. The beam adjuster 345 may transform the incident plane waves to concave waves.

As illustrated in FIG. 11D, the slider 819 may slide upstream from the position shown in FIG. 11B to move the spherical convex lens 811 in the direction getting closer to the spherical concave lens 812. The focal point 801 of the spherical convex lens 811 may be positioned upstream of the focal point 802 of the spherical concave lens 812. The beam adjuster 345 may transform the incident plane waves to convex waves.

As described above, the beam adjuster 345 may adjust the wavefront of the laser beam, the cross-sectional area of the laser beam, and the beam divergence. The beam adjuster 345 may include a not-shown high reflectance mirror and an actuator for controlling the tilt of the high reflectance mirror to control the direction of the laser beam.

Other Configuration Example 3

Figure 12:
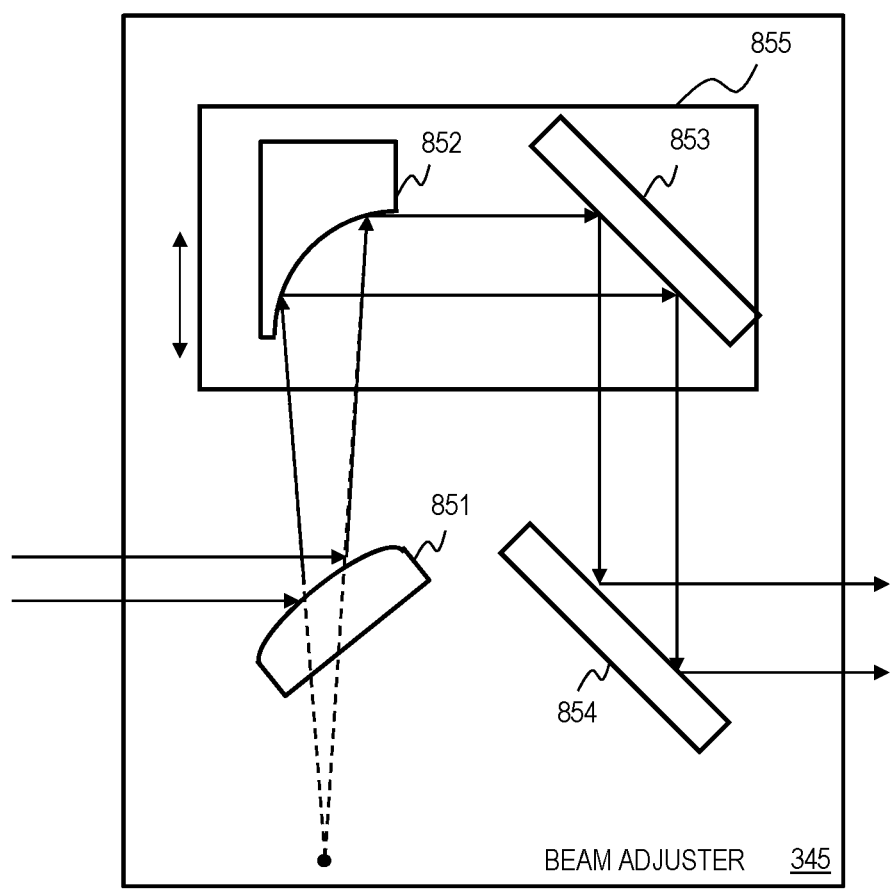
FIG. 12 illustrates another configuration example of the beam adjuster.

FIG. 12 illustrates another configuration example of the beam adjuster 345. The other beam adjusters 341 and 343 may also have the same configuration. The beam adjuster 345 may include an off-axis parabolic convex mirror 851, an off-axis parabolic concave lens 852, a plane mirror 853, a plane mirror 854, a mirror fixing plate 855, and a not-shown driving mechanism.

The off-axis parabolic convex lens 851 may be anchored with a not-shown mirror holder to the place to receive the laser beam. The off-axis parabolic convex mirror 851 may reflect the laser beam toward the off-axis parabolic concave mirror 852.

The reflection off the off-axis parabolic convex lens 851 may be adjustable to be regarded as the beam having the same wavefront as the light radiated from the focal point of the off-axis parabolic concave mirror 852. In the case where plane waves are coming, the focal point of the off-axis parabolic convex mirror 851 may be located at the same position as the focal point of the off-axis parabolic concave mirror 852.

The off-axis parabolic concave mirror 852 may be secured to the mirror fixing plate 855 with a not-shown mirror holder to be movable along the optical path of the laser beam reflected by the off-axis parabolic convex mirror 851. The off-axis parabolic concave mirror 852 may reflect the laser beam reflected by the off-axis parabolic convex mirror 851 toward the plane mirror 853.

The plane mirror 853 may be secured to the mirror fixing plate 855 with a not-shown mirror holder to be movable together with the off-axis parabolic concave mirror 852. The plane mirror 853 may reflect the laser beam reflected by the off-axis parabolic concave mirror 852 toward the plane mirror 854.

The plane mirror 854 may be fixed on the optical path of the laser beam reflected by the plane mirror 853 with a not-shown mirror holder. The plane mirror 854 may reflect the laser beam reflected by the plane mirror 853 toward an optical element disposed between the plane mirror 854 and the chamber 2.

The mirror fixing plate 825 may be movable by the driving mechanism in the longitudinal direction of the drawing sheet to extend and contract the distance between the mirror fixing plate 825 and the off-axis parabolic convex mirror 851 and the distance between the mirror fixing plate 825 and the plane mirror 854. Extending or contracting the distance between the mirror fixing plate 825 and the off-axis parabolic convex mirror 851 and the distance between the mirror fixing plate 825 and the plane mirror 854 may lead to adjusting the cross-sectional area of the laser beam.

The foregoing description is merely for the purpose of exemplification but not limitation. Accordingly, it is obvious for a person skilled in the art that the embodiments in this disclosure can be modified within the scope of the appended claims.

A part of the configuration of an embodiment can be replaced with a configuration of another embodiment. A configuration of an embodiment can be incorporated to a configuration of another embodiment. A part of the configuration of each embodiment can be removed, added to a different configuration, or replaced by a different configuration.

The terms used in this specification and the appended claims should be interpreted as "non-limiting". For example, the terms "include" and "be included" should be interpreted as "including the stated elements but not limited to the stated elements". The term "have" should be interpreted as "having the stated elements but not limited to the stated elements". Further, the modifier "one (a/an)" should be interpreted as "at least one" or "one or more."

What is claimed is:

1. A beam delivery system configured to deliver a pulse laser beam outputted from a laser apparatus to a target in an extreme ultraviolet light generation apparatus configured to generate extreme ultraviolet light by irradiating the target with the pulse laser beam, the beam delivery system comprising:
   a plurality of beam adjusters configured to adjust a divergence angle of a pulse laser beam outputted from the laser apparatus;
   a beam sampler configured to separate a part of the pulse laser beam outputted from a first beam adjuster provided at the most downstream among the plurality of beam adjusters to acquire a sample beam;
   a beam monitor configured to receive the sample beam and output a monitored diameter; and
   a beam delivery controller configured to control the plurality of beam adjusters based on the monitored diameter,
   wherein the beam delivery controller is configured to:
      adjust each of beam adjusters other than the first beam adjuster selected one after another from the most upstream so that the monitored diameter at the beam monitor becomes a predetermined value specific to the beam adjuster; and
      adjust the first beam adjuster so that the pulse laser beam becomes focused at a position downstream of a target position, and
   wherein the first beam adjuster is a final-stage beam adjuster in the beam delivery system.

2. The beam delivery system according to claim 1,
   wherein the beam delivery controller is configured to initialize each of the plurality of beam adjusters to output a collimated beam in a case of receiving a collimated beam, before performing the adjustment using the beam monitor,
   wherein a predetermined value specific to the first beam adjuster is larger than the predetermined values specific to the other beam adjusters in the plurality of beam adjusters, and
   wherein the beam delivery controller is configured to reduce the amount of light of the sample beam to enter the beam monitor in adjusting each of the other beam adjusters, compared to the amount of light of the sample beam to enter the beam monitor in adjusting the first beam adjuster.

3. A beam delivery system configured to deliver a pulse laser beam outputted from a laser apparatus to a target in an extreme ultraviolet light generation apparatus configured to generate extreme ultraviolet light by irradiating the target with the pulse laser beam, the beam delivery system comprising:
   a plurality of beam adjusters configured to adjust a divergence angle of a pulse laser beam outputted from the laser apparatus;
   a beam sampler configured to separate a part of the pulse laser beam outputted from a first beam adjuster provided at the most downstream among the plurality of beam adjusters to acquire a sample beam;
   a beam monitor configured to receive the sample beam and output a monitored diameter; and
   a beam delivery controller configured to control the plurality of beam adjusters based on the monitored diameter,
   wherein the beam delivery controller is configured to:
      adjust each of beam adjusters other than the first beam adjuster selected one after another from the most upstream so that the monitored diameter at the beam monitor becomes a predetermined value specific to the beam adjuster; and
   adjust the first beam adjuster so that the pulse laser beam becomes focused at a position downstream of a target position,
   wherein the first beam adjuster is configured to output a detection signal to the beam delivery controller when a focal point of the pulse laser beam reaches proximity of the target position, and
   wherein the beam delivery controller is configured to stop adjusting the first beam adjuster in response to the detection signal.

4. A control method for a beam delivery system in an extreme ultraviolet light generation apparatus configured to generate extreme ultraviolet light by irradiating a target with a pulse laser beam, the beam delivery system including a plurality of beam adjusters configured to adjust a divergence angle of the pulse laser beam, the control method comprising:
   instructing a laser apparatus to output a pulse laser beam;
   selecting each of beam adjusters other than a first beam adjuster provided at the most downstream among the plurality of beam adjusters one after another from the most upstream;
   monitoring a sample beam at downstream of the selected beam adjuster;
   adjusting the selected beam adjuster so that a monitored diameter of the sample beam becomes a predetermined value specific to the selected beam adjuster; and
   adjusting the first beam adjuster so that the pulse laser beam becomes focused at a point downstream of a target position.

5. The control method according to claim 4, wherein the first beam adjuster is a final-stage beam adjuster in the beam delivery system.

6. The control method according to claim 4, further comprising adjusting each of the plurality of beam adjusters to output a collimated beam in a case of receiving a collimated beam before performing the adjustment based on the monitored diameter.

7. The control method according to claim 6,
   wherein a predetermined value specific to the first beam adjuster is larger than the predetermined values specific to the other beam adjusters in the plurality of beam adjusters, and
   wherein the adjusting the other beam adjusters includes reducing the amount of light of the sample beam to enter the beam monitor, compared to the amount of light of the sample beam to enter the beam monitor in the adjusting the first beam adjuster.

8. The control method according to claim 4, further comprising:
   receiving a detection signal from the first beam adjuster when a focal point of the pulse laser beam reaches proximity of the target position; and
   stopping the adjusting the first beam adjuster in response to the detection signal.

* * * * *